Jan. 24, 1967  R. K. SHELBY  3,300,552
PROCESS FOR SELECTIVELY FOAMING SURFACE
AREAS ON A PLASTIC ARTICLE
Filed Oct. 28, 1964
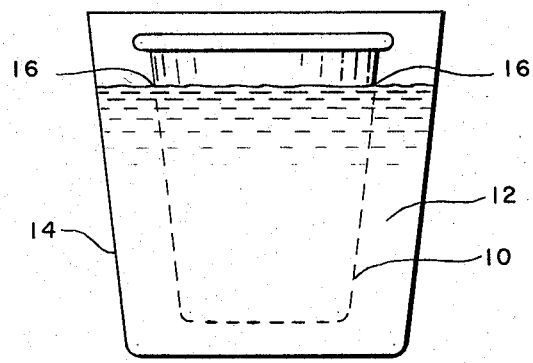
Fig. I
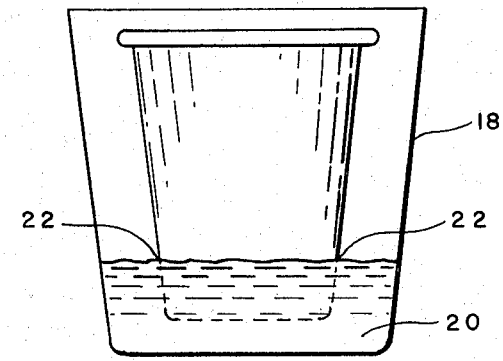
Fig. II
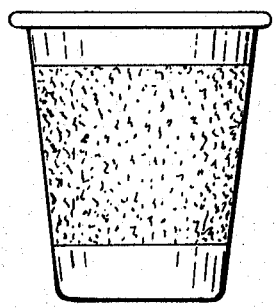
Fig. III
RICHARD K. SHELBY INVENTOR.
BY
ATTORNEY.

3,300,552
Patented Jan. 24, 1967

3,300,552
PROCESS FOR SELECTIVELY FOAMING SURFACE AREAS ON A PLASTIC ARTICLE
Richard K. Shelby, Downers Grove, Ill., assignor to Monsanto Company, St. Louis, Mo., a corporation of Delaware
Filed Oct. 28, 1964, Ser. No. 407,102
4 Claims. (Cl. 264—45)

The present invention relates to the manufacture of plastic articles and more particularly to the manufacture of plastic articles having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involve adhering or bonding solid or rigid members to the foam. However, these structures are generally difficult and expensive to construct and are sometimes limited in their application depending on the effectiveness of the bonding operation and the difficulty of preserving the foam intact.

In a copending application Serial Number 272,540, filed April 12, 1963, now Patent No. 3,262,625, there is described the formation of plastic articles which combine the insulating characteristics of foamed resin and the structural stability and strength of non-foamed plastic. In brief, these plastic articles are produced by steeping a plastic article in a fairly volatile medium which is absorbable by the plastic for a predetermined interval of time, removing the plastic article from the medium and finally heating the plastic article to produce a foamed cover. In this manner, plastic articles such as containers, conduits, etc. are obtained which have good insulating and structural characteristics. Unfortunately, serious problems have been encountered when attempting to control the extent of the area or surface on the plastic article to be foamed. This is primarily due to the difficulty of controlling the area extent of medium contact with the plastic article particularly at high speed production operations.

Accordingly, it is a principal object of the present invention to partially foam predetermined surface areas on plastic articles.

Another object of the present invention is to partially foam predetermined surface areas on plastic articles at high speed production rates.

A further object of the present invention is to control the extent of the foamed surface area on plastic articles which are exposed to a medium which is absorbable by the plastic and subsequently heated to foam portions of the plastic surface areas exposed to the medium.

A further object of this invention is to provide method and means to attain the preceding objects.

Other objects of this invention will in part be obvious and will in part appear hereinafter.

These and other objects are attained by exposing a surface of a plastic article to a primary liquid substance which is absorbable by the plastic and which will form a constant boiling mixture, when combined with a secondary liquid substance, having a boiling point temperature below the boiling point temperature of said primary liquid substance, selectively steeping at least a portion of said exposed surface in said secondary liquid substance, subjecting said exposed surface initially to a temperature level which will cause a substantial quantity of the primary and secondary liquid mixture absorbed within the portion of the surface which was exposed to the primary liquid substance and steeped in the secondary liquid substance to diffuse from the plastic and then secondarily to a temperature level above the boiling point temperature of said primary liquid substance to produce a foam covering at the previously exposed and unsteeped areas. The primary substance is considered to be any material which is (1) absorbable by the plastic being processed, (2) convertible to a gaseous state at a temperature below the melting point temperature of the plastic and (3) will form a constant boiling mixture when combined with a secondary liquid substance having a boiling point temperature below the boiling point temperature of the primary liquid substance. The secondary liquid substance is, of course, any liquid material which when combined with the primary liquid substance will form the constant boiling mixture. The plastic articles generally referred to herein include articles which are either wholly or partially fabricated from plastic.

The following drawings are provided for the purpose of illustrating various embodiments of the present invention.

FIGURE I is a side view, partly in section, illustrating a container being partially submerged in a primary liquid substance which is absorbable by the plastic.

FIGURE II is a side view, illustrating the same container shown in FIGURE I being selectively steeped with a secondary liquid substance in accordance with the practice of this invention.

FIGURE III is a side view of the container shown in FIGURES I and II after being subsequently heated to produce a foam covering.

Referring in detail to the figures of the drawings, and more specifically FIGURE I, there is schematically shown a container 10 which is substantially submerged in a primary liquid substance 12 confined in a tank 14 up to an immersion line designated 16—16. The container 10 is maintained in this position for a short interval of time before it is removed and transported towards and into a tank 18 shown in FIGURE II which contains a secondary liquid substance 20. As a result of this latter operation, the lower portion of the container is steeped in the secondary liquid substance 20 up to the line of immersion 22—22. After a few seconds, the container is removed from tank 18, subjected to a heating operation conducted at a temperature which is initially set to cause a proportion of the liquid mixture absorbed in the plastic below the line of immersion to diffuse out of the plastic and subsequently set at a higher temperature to cause the surface area of the container between the immersion lines 22—22 and 16—16 to foam. In other words, it is possible to selectively foam portions of a plastic or partially plastic article of manufacture by first exposing part or all of the plastic surface of said article to a primary liquid substance and then selectively steeping portions of the previously exposed plastic surface with a secondary liquid substance to form a mixture having a boiling point temperature below the boiling point temperature of the primary liquid substance which can be substantially diffused to prevent foaming at the steeped areas during the subsequent heating operation.

The above description and particularly the drawings are set forth for the purpose of illustration and not for the purpose of limitation. In the place of containers, any plastic or partial plastic article of manufacture which is foamable by the process described in copending application Serial Number 272,540, filed April 12, 1963, may be treated in the same manner to foam selective portions of the article. In addition to the tanks shown in FIGURES I and II of the drawings, any suitable equipment may be substituted which will serve the purpose of initially exposing the plastic article to a primary liquid substance which is absorbable by the plastic and subsequently partially steeping the plastic article in the secondary liquid substance.

In general, the plastics treated in the practice of this invention are plastic materials which have been fabricated into various shapes and includes polymers such as those based on styrene, vinyl halide, vinylidene halide, vinyl acetate, cellulose acetate or butyrate, ethyl cellulose, acrylic acid esters, metacrylic acid esters, acrylonitrile, ethylene, propylene and higher olefins, isobutylene, fluoro-olefins and chlorofluoro-olefins, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber modified polystyrene or polystyrene which preferably has incorporated therein a rubber compound grafted on to the molecule.

As previously indicated, the primary liquid substance which may be employed in the practice of this invention is any liquid substance which is (1) absorbable by the plastic being processed, (2) convertible to a gaseous state at a temperature below the melting point temperature of the plastic and (3) will form a constant boiling mixture when combined with a secondary liquid substance having a boiling point temperature below the boiling point temperature of the primary liquid substance. In other words, after the initial exposure of the plastic surface to the primary liquid substance, a predetermined portion of the plastic surface is subsequently steeped in a secondary liquid substance. At the area contacted by both the primary and secondary liquids, a constant boiling mixture is formed which has a lower boiling point temperature than the initial primary liquid substance. It is therefore obvious that the choice of the primary liquid substance is limited to absorbable liquids which will form constant boiling mixtures of the type described and that the choice of the secondary liquid substance depends in turn on the initial choice of the primary liquid substance. More specifically, the choice is limited to liquid mixtures or systems which form constant boiling mixtures and meet the other requirements previously set forth. For example, ethyl alcohol which has a boiling point of about 77° C. when mixed with benzene which has a boiling point of about 80° C. will form a constant boiling mixture at about 70 mol percent benzene having a boiling point temperature of about 65-66° C. which is substantially below the boiling point temperatures of either of the two components. It is also obvious in this case that the choice of which component will be the primary liquid substance will depend for the most part on the particular plastic being processed. In general, it is only necessary that the constant boiling mixture have a boiling point which is below the boiling point of the primary liquid substance in order that the constant boiling mixture can be substantially diffused from the plastic body. However, it is sometimes preferable to employ constant boiling systems which exhibit a minimum boiling point temperature which is below the boiling point temperature of any of the combined substances forming the constant boiling mixture. Typical primary liquid: secondary liquid systems which may find utility in the present invention include ethyl alcohol:benzene, ethyl alcohol:cyclohexane, ethyl alcohol:hexane, acetone: methyl acetate, acetone:diethylamine, allyl alcohol: hexane, propyl alcohol:toluene, methanol:trichloroethylene, methanol:ethyl bromide, methanol:pentane, and the like. The choice of which component of the above systems which may be best utilized as the primary liquid substance will depend for the most part on the particular plastic being processed. It is also possible and sometimes desirable to utilize systems which require more than two components to form the constant boiling mixture. For example, ternary systems may find utility in the practice of this invention. In this instance, the primary liquid substance will be (1) one or a mixture of two components and the secondary liquid substance will be the remaining component or components necessary to form the constant boiling mixture.

The exposure of the plastic to the primary liquid substance generally requires only a few seconds for maximum absorption depending for the most part on the depth of foam desired, the type of primary liquid substance used, and the respective temperatures of the liquid substance and the plastic. This operation may be carried out by any suitable method such as immersion of the plastic article in the primary liquid substance or even by subjecting the plastic article to vapors of the primary liquid substance in a vessel which may or may not be pressurized.

With regard to the steeping operation, the interval of time required for steeping is generally dependent on the type of primary liquid substance utilized, the interval of time of exposure to the primary liquid substance, the temperature level of the initial heating operation after steeping and the time period of exposure to the initial heating operation. In general, the optimum time of steeping to form the constant boiling mixture within the plastic can be readily determined by simple experimentation. The time balance between exposure to the primary liquid substance, steeping, and the initial heating operation should be such to produce little or no foaming at the area contacted by both the primary and secondary liquid substance during the subsequent heating operation. For the most part, the optimum time the plastic material should be exposed to the primary liquid substance will be determined first since this step has a substantial effect on the foam covering ultimately produced. In addition, the length of time between exposure to the primary liquid substance and the steeping operation should be kept to a minimum for optimum results.

As previously indicated, after the plastic article is steeped, the article is subjected to an initial heating operation conducted at a temperature level which will result in a portion of the liquid mixture which is absorbed in the plastic at the area contacted by both the primary and secondary liquids to diffuse out of the plastic. The portion which is diffused must be sufficient to substantially minimize any foaming during the subsequent or secondary heating operation which is conducted at a higher temperature. The portion of the liquid mixture which is removed will then depend on the temperature level of the initial heating operation and the time of exposure to this temperature. The optimum temperature level and time of exposure to this initial temperature level can be readily determined for the particular plastic which is to be processed by simple experimentation. Generally, this temperature will be near the boiling point temperature of the constant boiling mixture and in most instances only a few degrees below. If desired, the initial heating interval may be accelerated by forced air drafts, moderate heating conditions, etc.

After the initial heating operation, the heating temperature is increased in accordance with the practice of this invention to foam portions of the plastic article at designated areas that is those areas which were exposed to the primary liquid substance but not steeped. The heating means utilized may vary, the final results being affected by the uniformity of heating, rate of heating and temperature level at which it is conducted. The temperature level during the final or secondary heating stage will, of course, be above the boiling point temperature of the primary liquid substance. Any of the fundamental types of heat transfer, i.e., conduction, convection, and radiation may be utilized. For ease of handling, methods depending on convections are generally preferred, that is, the use of a preheated fluid or more preferably a preheated gas circulating within, around or adjacent the plastic article resulting in a heat transfer from the gas to the plastic. In the case of biaxially oriented plastic, it is sometimes desirable to support or fix the sheet dimensionally during the heating operation to avoid loss of orientation.

The following example is given to illustrate the invention and is not intended as a limitation thereof. Unless otherwise specified, quantities are mentioned on a weight basis.

*Example I*

Styrene homopolymer having a Staudinger molecular weight of approximately 55,000 is injection molded in the form of a smooth, tapered cup which is approximately four inches in height with an average inside cup diameter of two and one-quarter inches.

The cup formed by the above-described operation is immersed in ethyl alcohol (70° F. approximately) up to within one-half inch of its top peripheral edge. After a ten second interval, the cup is withdrawn from the alcohol and then dipped in benzene (70° F. approximately) up to one-half-inch from its bottom edge for a 20 second interval. After the cup is withdrawn from the benzene bath, it is exposed to air at a temperature of 60° C. for 20 seconds and then to air at a temperature of 80° C. for a period of ten seconds.

The resulting cup has a foamed outer surface throughout the area previously immersed in the ethyl alcohol except at the area which was steeped in the benzene extending into the body of the cup approximately a third of its overall thickness. Further examination of the cup discloses that the overall structural properties of the cup are not seriously altered by the above-described process while at the same time the insulating properties of the cup are increased several fold.

The products of this invention are formed from plastic materials either in whole or in part. The structures which may be fabricated in the practice of this invention are exceptionally useful for applications requiring high insulating characteristics at defined areas and good structural properties. The products formed in the practice of this invention can be most advantageously used in dispensing or vending applications which require stacking arrangements. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup foamed must be rigidly controlled.

It is obvious that many variations may be made in the products and processes set forth above without departing from the spirit and scope of this invention.

What is claimed is:

1. The process for selectively foaming predetermined surface areas on a plastic article which comprises exposing a surface of a plastic article to a primary liquid substance which is absorbable by the plastic and which will form a constant boiling mixture when combined with a secondary liquid substance, having a boiling point temperature below the boiling point temperature of said primary liquid substance, selectively steeping at least a portion of said exposed surface in said secondary liquid substance, subjecting said exposed surface initially to a temperature level which will cause a substantial quantity of the primary and secondary liquid mixture absorbed within the portion of the surface which was exposed to the primary liquid substance and steeped in the secondary liquid substance to diffuse from the plastic and then secondarily to a temperature level above the boiling point temperature of said primary liquid substance.

2. The process according to claim 1 wherein the boiling point temperature of the secondary liquid substance is also above a boiling point temperature of said constant boiling mixture.

3. The process according to claim 2 wherein the primary liquid substance is ethyl alcohol and the secondary liquid substance is benzene.

4. The process for selectively foaming predetermined surface areas on a plastic container which comprises exposing a portion of the outer surface of a plastic container to a primary liquid substance which is absorbable by the plastic and which will form a constant boiling mixture, when combined with a secondary liquid substance, having a boiling point temperature below the boiling point temperature of the primary liquid substance, selectively steeping at least a portion of said exposed surface in said secondary liquid substance, subjecting said exposed surface initially to a temperature level which will cause a substantial quantity of the primary and secondary liquid mixture absorbed within the portion of the surface which was exposed to the primary liquid substance and steeped in the secondary liquid substance to diffuse from the plastic and then secondarily to a temperature level above the boiling point temperature of said primary liquid substance.

References Cited by the Examiner

UNITED STATES PATENTS 3,042,972  7/1962  Lafferty _____ 264—53
3,262,625  7/1966  Russell _____ 264—45 XR ALEXANDER H. BRODMERKEL, *Primary Examiner.*

P. E. ANDERSON, *Assistant Examiner.*